United States Patent [19]

Richter et al.

[11] Patent Number: 4,655,969

[45] Date of Patent: Apr. 7, 1987

[54] CHEMILUMINESCENT SYSTEMS

[76] Inventors: Herbert P. Richter, 705 Sydnor; Ronald A. Henry, 329 Perdew; Joseph H. Johnson, 201 S. Locust, all of Ridgecrest, Calif. 93555

[21] Appl. No.: 719,788

[22] Filed: Apr. 3, 1985

[51] Int. Cl.$^4$ .......................... C09K 11/00; G08B 9/00
[52] U.S. Cl. ..................................... 252/700; 116/23; 116/26
[58] Field of Search .................... 252/700; 116/23, 26

[56] References Cited

U.S. PATENT DOCUMENTS

| | | | |
|---|---|---|---|
| 3,557,233 | 1/1971 | Zweig | 252/700 |
| 3,749,679 | 7/1973 | Rauhut | 252/188.3 |
| 3,816,326 | 6/1974 | Bollyky | 252/188.3 |
| 3,888,786 | 6/1975 | Maulding | 252/700 |
| 3,969,263 | 7/1976 | Richter et al. | 252/186 |
| 4,076,645 | 2/1978 | Vega | 252/188.3 CL |
| 4,401,585 | 8/1983 | Arthen, Jr. et al. | 252/700 |

*Primary Examiner*—John F. Terapane
*Assistant Examiner*—Catherine S. Kilby
*Attorney, Agent, or Firm*—W. Thom Skeer

[57] ABSTRACT

Chemiluminescent mixtures utilize mono and di-alkyl substituted 9,10-bis(phenylethynyl)anthracene derivatives to provide higher chemiluminescence efficiencies. The preferred fluorescers are 2-ethyl-9,10-bis(phenylethynyl)anthracene and 1,4-dimethyl-9,10-bis(phenylethynyl)anthracene.

2 Claims, No Drawings

CHEMILUMINESCENT SYSTEMS

BACKGROUND OF THE INVENTION

1. Field of the Invention

The invention disclosed herein relates to novel chemiluminescent systems or mixtures and to the use of novel fluorescer compounds for generating chemiluminescence. More particularly, this invention provides improved light yields at lower temperatures for longer periods of time utilizing the novel fluorescer compounds in oxalate esterfluorescer-hydrogen peroxide chemiluminescent systems.

2. Description of the Prior Art

Substituted 9,10-bis(phenylethynyl)anthracenes and their use as fluorescers with certain oxalate compounds which react with peroxide to produce chemiluminescence are known in the art.

SUMMARY OF THE INVENTION

The present invention provides fluorescers for chemiluminescent mixtures that have higher chemiluminescence efficiencies and light output as measured by the light capacity, than those disclosed in the prior art. This invention uses mono and di-alkyl substituted 9,10-bis(phenylethynyl)anthracenes to give greater efficiency to the oxalate ester chemiluminescent reaction. The preferred fluorescent dyes 2-ethyl-9,10-bis(phenylethynyl)anthracene(2EBPEA) and 1,4-dimethyl- 9,10-bis(phenylethynyl)anthracene (1,4-DMBPEA) are used to achieve a significant improvement in light output at lower temperatures and also as bright, short duration formulations at ambient temperatures.

OBJECTS OF THE INVENTION

It is an object of this invention to obtain chemiluminescent compositions and a process employing said compositions whereby a high efficiency may be obtained in the conversion of chemical energy into light.

Another object is to obtain chemiluminescent compositions which produce light over an extended period of time at substantially reduced temperatures.

Yet another object of this invention is to obtain chemiluminescent compositions which are stable over a long period of time and which may be subsequently reacted to produce chemiluminescent light.

These and still further objects, features and advantages of the present invention will become apparent upon consideration of the following detailed disclosure.

DETAILED DESCRIPTION OF THE INVENTION

The present invention provides novel mixtures for generating chemiluminescence. These reaction mixtures comprise (a) a fluorescer compound, (b) a chemiluminescent reactant, and (c) a diluent, in proportions and concentrations to produce chemiluminescence when the mixtures are reacted with a peroxide component.

The fluorescers of the present invention are particularly distinguished from the prior art fluorescers in chemiluminescent mixtures by the fact that they provide higher light yields than known substituted 9,10-bis(phenylethynyl)anthracenes, i.e., from about 400 to about 1000 lumen-hours per liter versus about 280 lumen-hours per liter for unsubstituted 9,10-bis(phenylethynyl)anthracene.

The term "chemiluminescence," as employed herein, is defined as the generation of electromagnetic radiation between about 300 and about 1200 nanometers by means of a chemical reaction.

The term "chemiluminescent reactant" is defined as any compound which enters into a chemical reaction with a peroxide component to produce chemiluminescence. The preferred chemiluminescent reactants for use in this invention are oxalic acid esters such as bis(6-carbopentoxy-2,4,5-trichlorophenyl)oxalate abbreviated as CPPO.

The term "composition for reaction with a peroxide component to generate chemiluminescence," as employed herein, is defined as a mixture of a fluorescer compound of the present invention and a chemiluminescent reactant in a diluent in concentrations sufficient to produce chemiluminescence by admixing with a peroxide/catalyst component. Thus, the initial concentrations of the fluorescer compound, the reactant compound, and the ingredients of the peroxide component in the reaction mixture must be sufficient to produce chemiluminescence.

The term "admixing," as used herein, means "reacting" or sufficiently bringing together component reactants to obtain chemiluminescence.

The composition for reaction with a peroxide component to generate chemiluminescence may comprise a liquid which will solubilize the fluorescer compound and the reactant compound to provide initial concentrations in the reaction system of about 0.02M to about 0.2M of the reactant compound and about 0.005M to about 0.05M of the fluorescer compound. This liquid diluent must be relatively unreactive toward the other ingredients of the chemiluminescent mixture.

The molar concentrations of the reactant compound, and the fluorescer compound in the composition before addition and reaction with the peroxide component is about 1.3 times the molar concentrations of the same materials in the reacting system described above.

Typical diluents which can be used in the composition for reaction with a peroxide component include esters, ethers, aromatic hydrocarbons, with dibutyl phthalate preferred. Any fluid diluent can be employed providing said diluent solubilizes the oxalate compound to provide initial concentrations of the oxalate in the reacting system of from about 0.02M to about 0.2M inclusive, and is nonreactive toward the oxalate.

As previously stated, the peroxide component may be any peroxide, hydroperoxide, or hydrogen peroxide compound. Typical hydroperoxides include t-butylhydroperoxide, peroxybenzoic acid, and hydrogen peroxide. Hydrogen peroxide is the preferred hydroperoxide and may be employed as a solution of hydrogen peroxide in a solvent or as an anhydrous hydrogen peroxide compound such as perhydrate of urea (urea peroxide), sodium perborate, sodium peroxide, and the like. Whenever hydrogen peroxide is contemplated to be employed, any suitable compound may be substituted which will produce hydrogen peroxide.

Diluents which can be employed in the peroxide component include any fluid which is relatively unreactive toward the hydroperoxide, the oxalate and the fluorescer, and which accommodates a solubility to provide at least 0.01M hydroperoxide. Typical solvents for the hydroperoxide component include substituted alkanes, such as 3-methyl-3-pentane; alcohols, such as ethanol and tertiary butanol, and 3-methyl-3-pentanol, and esters, such as ethyl acetate and dimethyl phthalate.

The preferred diluent for the peroxide component is a mixture of about 80 volume percent dimethyl phthalate and about 20 volume percent tertiary butanol, or 3-methyl-3-pentanol or an 80/20 mixture of 3-methyl-3-pentanol and tertiary butanol.

The hydrogen peroxide concentration in the peroxide component may range from about 1M to about 2M. Preferably, the concentration is about 1.5M.

The lifetime and intensity of the chemiluminescent light emitted can be regulated by the use of certain regulators such as:

(1) By the addition of a catalyst which changes the rate of reaction of hydroperoxide with the oxalate ester. Catalysts which accomplish this objective include lithium salicylate, lithium 5-t-butyl salicylate and lithium 2-chloro-benzoate.

(2) By the variation of hydroperoxide. Both the type and the concentration of hydroperoxide influence regulation.

The fluorescer compounds of the present invention are based on 9,10-bis(phenylethynyl)anthracene substituted with electron donating substituents. The electron donating substituents include methyl, ethyl, propyl, isopropyl and t-butyl alkyl groups. The alkoxy substituent groups include for example methoxy, ethoxy, propoxy as well as isopropoxy, t-butoxy and the like.

Preferred fluorescer compounds are 2-ethyl-9,10-bis(phenylethynyl) anthracene and 1,4-dimethyl-9,10-bis(phenylethynyl)anthracene. The ethyl substituted anthracene derivative is prepared from the corresponding 2-ethyl-9,10-bis(phenylethynyl)9,10-anthradiol.

SYNTHESIS OF 2-ETHYL-9,10-BIS(PHENYLETHYNYL)ANTHRACENE

From 20.5 grams (0.087 mole) of 2-ethylanthraquinone, 17.6 grams (0.172 mole) of phenylacetylene, and 4 grams of lithium amide in 200 ml. dry dioxane was obtained 33.9 grams of mixed mono- and di- adducts. Recrystallization from 115 ml. of benzene at about 5° C. gave 22.3 grams of the diol. From 11.0 grams (0.025 mole) of the once recrystallized anthradiol, 110 ml. of acetone, 18.8 grams of stannous chloride dihydrate and 140 ml. of 50% aqueous acetic acid there was obtained a quantitative yield of crude 2-ethyl-9,10-bis(phenylethynyl) antrhracene. It was purified by solution in 800 ml. of boiling cyclohexane, stirring with 10 grams of Celite (trademark for diatomaceous earth prepared by Johns-Manville Corp.), filtering through a hot funnel, cooling to about 5° C. and filtering. The yield of orange, crystalline solid, melting point of 171°-174° C., was 8.5 grams (83.5%).

The 1,4-dimethyl substituted anthracene derivative is synthesized from the corresponding anthraquinone.

SYNTHESIS OF 1,4-DIMETHYL-9,10-BIS(PHENYLETHYNYL)ANTHRACENE

Into a suitable container were placed 25 grams of 1,4-naphthoquinone, 15 grams (0.183 mole) of trans, trans-2,4-hexadiene and 50 ml. of ether and 100 ml. of absolute ethanol. The tightly stoppered container stood at room temperature for about 10 days with occasional stirring. Thereafter, the solution was diluted with 400 ml. of 95% ethanol containing 25 grams of 85% potassium hydroxide and then refluxed for 8 hours while a stream of air was bubbled through the mixture. After cooling overnight at 5° C., the solid product was filtered, washed three times with cold ethanol, then repeatedly with water until free of base, and finally once more with cold ethanol. The yield of dried 1,4-dimethyl-9,10-anthraquinone was 31.4 grams or 83%. Next, 13.0 grams (0.127 mole) of phenylacetylene, 2,9 grams (0.126 mole) of lithium amide, and 200 ml. of anhydrous dioxane were refluxed and stirred in a nitrogen atmosphere for 2 hours. After the solution had cooled, 13.3 grams (0.051 mole) of dried 1,4-dimethyl-9,10-anthraquinone was added in one portion. Refluxing and stirring under a nitrogen atmosphere was resumed and continued for 16 hours. Most of the dioxane was removed under reduced pressure. The cooled residue was stirred with 6.5 grams of ammonium chloride in 200 ml. of water, heated to 50° C. and then cooled to room temperature. After filtering, the crude anthradiol was washed with cold water, twice with pentane, and then vacuum dried at 70° C., at 25 mm pressure for 24 hours, providing 24.6 grams of crude product. Recrystallization from 150 ml. of benzene gave 16.7 grams or 67% of a mixture of epimers of 1,4-dimethyl-9,10-anthradiol.

The anthradiol B epimer (16.7 grams) in 180 ml. of acetone was added dropwise over a twenty minute period to a reaction flask containing a solution consisting of 28.3 grams (0.125 ml.) of stannous chloride dihydrate in 220 ml. of 50% aqueous acetic acid under a nitrogen atmosphere. After stirring overnight at room temperature under nitrogen, 4.5 grams of Celite was added and the slurry filtered. The cake was washed with water until free of acid, vacuum dried first at ambient and then the dried cake was extracted with 350 ml. of boiling benzene while protecting the solution from light. Cooling of the extract to 5° C. yielded 10.4 grams of orange crystalline solid product, mp 174°-176° C. A second crop of 1.2 grams of product was recovered by diluting the mother liquor with 300 ml. of n-pentane and cooling to −15° C. The total yield was 77%.

DESCRIPTION OF THE PREFERRED EMBODIMENT

The following examples are illustrative of the present invention.

EXAMPLES 1-4

In the examples the commercially available fluorescent dyes 9,10-bis(phenylethynyl)anthracene (BPEA) and 1-chloro-9,10-bis(phenylethynyl)anthracene (1-ClBPEA) are compared to 2-ethyl-9,10-bis(phenylethynyl)anthracene (2EBPEA) and 1,4-dimethyl-9,10-bis(phenylethynyl)anthracene (1,4-DMBPEA) to show the unexpected enhanced performance of the 2-ethyl and 1,4-dimethyl fluorescers at very low temperatures. The reaction mixtures each contained 3 parts of 0.175M bis(4,5-trichloro-6-carbopentoxyphenyl)oxalate and 0.0075M of a fluorescent dye (defined in Table 1) in the solvent dibutylphthalate and 1 part of 1.5M hydrogen peroxide, with 0.03M lithium salicylate as the catalyst in the solvent 3-methyl-3-pentanol. The results in Table 1 clearly demonstrate that increased luminosity is obtained over an initial 60 minute time interval at −32° C. (−25° F.) utilizing the fluorescers 2-ethyl-9,10-bis(phenylethynyl)anthracene and 1,4-dimethyl-9,10-bis(phenylethynyl)anthracene.

TABLE 1

| Example | Dye | Luminosity (1 m. $1^{-1}$)$^{(a)}$ | | | |
|---|---|---|---|---|---|
| | | 0 Min. | 10 Min. | 30 Min. | 60 Min. |
| 1. | 1,4-DMBPEA | 104 | 135 | 94 | 62 |

TABLE 1-continued

| Example | Dye | Luminosity (l m. l$^{-1}$)[a] | | | |
|---|---|---|---|---|---|
| | | 0 Min. | 10 Min. | 30 Min. | 60 Min. |
| 2. | 2-EBPEA | 54 | 60 | 47 | 31.5 |
| 3. | 1-ClBPEA | 28.5 | 30.5 | 21 | 16 |
| 4. | BPEA | 16.5 | 19 | 16 | 12.5 |

[a] lumens per liter.

In comparing the integrated light yields over the 60 minute interval, the 1,4-DMBPEA and 2-EBPEA fluorescers gave unexpectedly high yields of 905 and 438 lumen-hours per liter, respectively. The commercial reference dyes 1-ClBPEA and BPEA gave 213 and 150 lumen-hours per liter, respectively.

It is within the scope of this invention to make such modifications of the compositions and processes disclosed herein as would be obvious to a person of ordinary skill in this art, and it is to be understood that the examples illustrating this invention are intended to limit the invention only insofar as is stated in the specification and as the following claims are limited.

What is claimed is:

1. In a method for producing light in low temperature systems operating at temperatures of about −32° C. having the steps of bringing a hydrogen peroxide component containing a catalyst and an oxalate ester-fluorescer component together and allowing said components to react to produce said light, the improvement comprising in utilizing within said oxalate ester-fluorescer component a di-substituted fluorescer at a concentration of about 0.0075M selected from the group consisting of 1,4-substituted 9,10-bis(phenylethynyl) anthracene derivatives substituted with electron donating substituents selected from the group consisting of methyl, ethyl, propyl, isopropyl and t-butyl alkyl groups as well as methoxy, ethoxy, propoxy, isopropoxy and t-butoxy alkoxy groups.

2. In a method for producing light in low temperature systems operating at temperatures of about −32° C. having the steps of bringing a hydrogen peroxide component containing a catalyst and an oxalate ester-fluorescer component together and allowing said components to react to produce said light, the improvement comprising in utilizing within said oxalate ester-fluorescer component the di-alkyl fluorescer 1,4-dimethyl-9,10-bis(phenylethynyl) anthracene at a concentration of about 0.0075M.

* * * * *